United States Patent Office 3,201,261
Patented Aug. 17, 1965

3,201,261
PROCESS FOR PREPARING DRIED EGGS
Richard T. Carey and Robert M. Blanken, Syracuse, N.Y., assignors to The Borden Company, New York, N.Y., a corporation of New Jersey
No Drawing. Filed Mar. 29, 1963, Ser. No. 269,172
5 Claims. (Cl. 99—210)

This invention relates to a process for the preparation of dried whole egg solids, and more particularly to a process for the preparation of such solids having substantially improved free-flowing characteristics.

The term dried "whole egg solids" denotes a mixture of egg yolk and egg white or albumen in substantially any proportions and not necessarily in the ratio normally found in whole eggs. In other words, the term is intended to include not only dried whole eggs but a product produced by mixing dried egg white and dried egg yolk in any proportions.

It is common practice in the food industry to prepare dried whole egg solids by the spray drying of raw whole eggs or by the separate spray drying of raw egg white and raw egg yolk which are thereafter combined in any desired proportions. Such dried whole egg solids are suitable for use in the manufacture of various prepared foods such as cake mixes and the like. In preparing dried egg solids in the manner indicated, one of the problems which has faced the manufacturer has been to achieve a product which will be free-flowing. It has been found in the past that conventionally prepared dried whole egg solids tend to "ball up," form lumps and pour poorly from containers.

Various proposals have been made for overcoming these undesirable free-flowing characteristics of dried whole egg solids. For example, it has been suggested that dried egg solids be subjected to extraction with a fat solvent. It has also been proposed to incorporate various additives in the egg product. In addition, rather complicated drying processes have been proposed requiring unusually carefully controlled moisture and temperature conditions and particular sequential operation.

The present invention is directed to a method for preparing dried whole egg solids having substantially improved free-flow characteristics in a manner which is simple, economical and effective without requiring the incorporation of any foreign additives, without requiring unusually careful control of moisture and temperature conditions during drying and without requiring any special solvent treatment.

In general, the present process is accomplished by the comminution of dried egg whites or albumen to a particle size substantially smaller than is obtained in normal spray drying and thereafter mixing the so comminuted dried egg white with whole dried egg solids or dried egg yolk solids to produce a free-flowing product containing both egg white and egg yolk.

It has been found that egg white or albumen when spray dried using conventional techniques produces a product having a particle size predominantly in the range of 15 to 34 microns or larger. This product when mixed with dried egg yolk to prepare whole egg solids feels wet to the hand, tends to agglomerate and "ball up" and does not pour well from containers having a pouring spout.

Dried egg yolk solids will vary in diameter from about 17 to about 150 microns and are not free-flowing. Yolk solids contain a minimum of about 57% fat that has a melting point of about 90° F. and attempts to reduce the size of the solids results in a pasted mixture because of this high percentage of fat.

On the other hand, when the generally, spherical, conventionally spray-dried egg white particles are ground in a ball-mill or grinder, whereby spherules become ruptured in random geometrical orientation and result in a particle size of 3.4 microns or less, for a major proportion of the particles, there may be prepared dried whole egg solids having excellent free-flowing characteristics. When these comminuted egg white particles are mixed with egg yolk solids or whole egg solids, the resulting material does not "ball up" and pours readily from a container. The degree of free-flowing characteristics of the product can be regulated by varying the proportion of the comminuted egg white particles in the over-all product, or more precisely by varying the proportions of comminuted particles having a diameter of 3.4 microns or less.

It is preferred that the final product contain at least 37.5 weight percent of comminuted albumen particles having a maximum diameter of about 3.4 microns. The remaining 62.5 percent may comprise dried egg yolk solids or egg white solids and egg yolk solids. A particularly preferred composition contains a ratio of 30 parts comminuted spray-dried egg white particles wherein at least 75% have a diameter of 3.4 microns or less and 50 parts of spray-dried egg yolk solids.

The more detailed practice of the invention is illustrated by the following examples wherein parts are given by weight unless otherwise specified. The examples and embodiments are illustrative only, and the invention is not intended to be limited thereto except as indicated by the appended claims.

EXAMPLE 1

Spray dried egg white and egg yolk are separately prepared in the conventional manner in the usual spray drying apparatus.

The dried egg white, for example, is prepared as follows:

The egg white is first passed through a coarse screen to break up the more viscous or semi-solid portion and reduce its viscosity to about that of the thinner portion. The egg white is then desugared, as by fermentation, and spray dried. The spray drying is accomplished in a spray box which is equipped with one or more nozzles that atomize the egg white which is forced through the nozzles under a pressure of about 1,000 p.s.i. The spray box is so equipped that hot air, ranging in temperature from 275° to 400° F., enters the box behind the nozzle or nozzles and carries the atomized particles deeper into the box. During this travel the moisture content of egg white is reduced from about 90% to 5% or less. At the far end of the box there is an outlet with an arrangement of bag collectors that allow the moist air to escape, but trap the dried egg white. The dried egg white falls to the floor of the box once the turbulence of the hot air is lessened at the far end of the box and is removed therefrom by a sweeping device. Spray dried egg white particles produced in the above manner and being generally spherical and relatively uniform in diameter were microscopically examined for size. Half of the spray dried particles were thereafter ground in a ball mill for a period of two hours and the ground particles were also microscopically examined.

The microscopic measurements were made by using a microscope fitted with an eye piece having an ocular scale and a stage micrometer (scaled in millimeters) beneath the objective. When both were properly adjusted the length of an ocular scale was measured and the length of the scale was calculated as a factor or constant. The micrometer was then removed. In its place was positioned a glass slide on which was dispersed a small amount, about .01 gram, of the dried egg albumen. The diameters of individual particles of the egg albumen were then measured in terms of the ocular value. This value was then multiplied by the factor or constant to give the diameter of the particles in millimeters. The following table illustrates the difference in particle size characteristics of the non-ground albumen and the ground albumen.

*Table 1*

THE DIAMETER OF NON-GROUND, SPRAY-DRIED ALBUMEN SPHERULES AND GROUND, SPRAY-DRIED ALBUMEN PARTICLES

| Non-Ground Albumen | | | Ground Albumen | | |
|---|---|---|---|---|---|
| Frequency | Percent Frequency | Dia. in Microns | Frequency | Percent Frequency | Dia. in Microns |
| 5 | 7.5 | 7.7 | 28 | 48.3 | 1.7 |
| 14 | 20.9 | 15.3 | 14 | 24.1 | 3.4 |
| 12 | 17.9 | 23.0 | 7 | 12.1 | 5.1 |
| 15 | 22.4 | 30.8 | 3 | 5.2 | 6.8 |
| 13 | 19.4 | 38.4 | 4 | 6.9 | 8.5 |
| 2 | 3.0 | 46.0 | 2 | 3.4 | 10.2 |
| 2 | 3.0 | 54.0 | | | |
| 2 | 3.0 | 61.5 | | | |
| 1 | 1.5 | 69.0 | | | |
| 0 | 0 | 77.0 | | | |
| 1 | 1.5 | 84.7 | | | |
| ¹ 67 | ² 100.1 | | ¹ 58 | ¹ 100.0 | |

¹ Total.
² Is 100.1%, not 100% due to rounding off of numbers.

Thirty grams of the above-described spray-dried, non-ground albumen is mixed with 50 grams of egg-yolk solids and screened through a 14-mesh screen. Thirty grams of the above-described spray-dried ground albumen which has been ground in a ball-mill is also mixed with 50 grams of egg-yolk solids and screened through a 14-mesh screen.

This screening is accomplished by placing the mixture on the 14-mesh screen with four ¾ inch steel balls, shaking the screen, and allowing the mixture to fall through. For each product 50 grams of the material which has been screened is deposited on a 14-mesh screen mounted on a circular frame of 4¾ inch diameter. The screen with the product is shaken 15 times through a 2-inch stroke, requiring 10 seconds for the operation. The whole egg product remaining on the screen is weighed and the percentage retention calculated. Results of numerous analyses upon whole egg solids prepared with the non-ground albumen show the amount retained on the screen ranges from 37.5 to 39.7 grams (75.0 to 79.4%) with an average of 38.2 grams (76.4%). Results upon whole egg solids prepared with ground albumen show the amount retained on the screen ranges from 0.9 to 2.0 grams (1.8 to 4.0%) with an average of 1.6 grams (3.2%). The following Table 2 illustrates such results and clearly shows the substantially great improvement in the free-flowing property of whole egg solids prepared with ground albumen solids as compared to non-ground albumen solids.

*Table 2*

AMOUNT OF EGG SOLIDS RETAINED ON NO. 14 MESH SCREEN USING NON-GROUND, SPRAY-DRIED ALBUMEN OR GROUND, SPRAY-DRIED ALBUMEN IN PREPARING WHOLE EGG SOLIDS

| Stokes | Non-Ground Albumen | | Ground Albumen | |
|---|---|---|---|---|
| | Grams Retained | Percent Retention | Grams Retained | Percent Retention |
| 15 | 39.3 | 78.6 | 2.0 | 4.0 |
| 15 | 37.5 | 75.0 | 1.8 | 3.6 |
| 15 | 37.6 | 75.2 | 1.5 | 3.0 |
| 15 | 39.7 | 79.4 | 1.5 | 3.0 |
| 15 | | | 2.0 | 4.0 |
| 15 | | | 0.9 | 1.8 |
| 15 | | | 1.6 | 3.2 |
| 130 | 4.0 | 8.0 | | |
| 150 | 2.5 | 5.0 | | |

EXAMPLE 2

Following the same procedure as just described in Example 1, the test for the free-flowing property was again conducted except that in this case 30 grams of egg white was mixed with 70 grams of dried egg yolk. The results obtained are illustrated in the following Table 3. It will be noted that the free-flowing characteristics are diminished by the fact that the proportion of ground egg albumen represents a smaller proportion of the total product.

*Table 3*

AMOUNT OF EGG SOLIDS RETAINED ON NO. 14 MESH SCREEN USING NON-GROUND, SPRAY-DRIED ALBUMEN OR GROUND, SPRAY-DRIED ALBUMEN IN PREPARING WHOLE EGG SOLIDS AT 3:7 RATIO

| Strokes | Non-Ground Albumen | | Ground Albumen | |
|---|---|---|---|---|
| | Grams Retained | Percent Retained | Grams Retained | Percent Retained |
| 15 | 34.3 | 68.6 | 11.5 | 23.0 |
| 15 | 35.1 | 70.2 | 13.5 | 27.0 |
| 15 | 37.2 | 74.4 | 12.0 | 24.0 |
| 15 | 35.2 | 70.4 | 11.0 | 22.0 |
| 15 | 37.5 | 75.0 | 10.5 | 21.0 |
| 15 | 38.8 | 77.6 | 7.0 | 14.0 |
| 130 | 5.1 | 10.2 | | |
| 150 | 2.9 | 5.8 | | |

EXAMPLE 3

When following the same procedure as just described except that the comminuted egg white particles are blended with dried whole eggs or with non-ground egg white particles before addition to dried egg yolk, there is also achieved substantially improved free-flowing characteristics.

Although the present invention has been described in connection with preferred embodiments, it is to be understood that modifications and variations may be resorted to, without departing from the spirit and scope thereof, as those skilled in the art will readily understand. Such variations and modifications are considered to be within the purview and scope of the appended claims.

We claim:

1. A process of preparing dried whole egg solids of improved free-flowing characteristics, comprising comminuting dried egg albumen to produce a major portion of particles having a diameter of less than about 3.4 microns, and thereafter mixing the comminuted particles with a material selected from the group consisting of (1) dried egg yolk and (2) dried egg yolk mixed with dried egg albumen, said comminuted albumen being added in an amount sufficient to increase the free flowing characteristics of the mixture.

2. A process of preparing dried whole egg solids of improved free-flowing characteristics, comprising mixing spray-dried egg albumen which has been comminuted to produce a major proportion of particles with a diameter of less than about 3.4 microns with a material selected from the group consisting of (1) spray-dried egg yolk solids and (2) spray-dried egg yolk solids and spray-dried egg white solids, said comminuted albumen being added in an amount sufficient to increase the free-flowing characteristics of the mixture.

3. A process according to claim 2 wherein the comminuted spray-dried egg albumen is mixed with spray-dried egg yolk.

4. A process according to claim 3 wherein the ratio of comminuted spray-dried egg albumen to spray-dried egg yolk is about 3:5 and wherein at least 75% of the comminuted egg albumen has a particle size of less than about 3.4 microns.

5. A process of preparing dried whole egg solids of improved free flowing characteristics, comprising mixing spray-dried egg albumen which has been comminuted to produce a major proportion of particles with the diameter of less than about 3.4 microns with the material selected from the group consisting of (1) spray dried egg yolk solids and (2) spray dried egg yolk solids and spray dried egg white solids, the proportion of comminuted albumen in the final product being at least 37.5 weight percent of comminuted albumen particles of less than 3.4 micron diameter.

References Cited by the Examiner
UNITED STATES PATENTS

| | | | |
|---|---|---|---|
| 1,891,887 | 12/32 | Clickner | 99—210 |
| 2,953,457 | 9/60 | Sanna | 99—56 |
| 2,998,316 | 8/61 | Reich | 99—71 |
| 3,039,107 | 6/62 | Bradford | 159—48 |
| 3,060,038 | 10/62 | Mancuso et al. | 99—210 |

A. LOUIS MONACELL, *Primary Examiner*.

WILLIAM B. KNIGHT, *Examiner*.